(12) United States Patent
Patro et al.

(10) Patent No.: US 8,954,601 B1
(45) Date of Patent: Feb. 10, 2015

(54) AUTHENTICATION AND ENCRYPTION OF ROUTING PROTOCOL TRAFFIC

(75) Inventors: Sunil Patro, San Francisco, CA (US);
Nischal Sheth, Los Altos, CA (US);
Ravi Gadde, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1952 days.

(21) Appl. No.: 11/774,872

(22) Filed: Jul. 9, 2007

Related U.S. Application Data (60) Provisional application No. 60/944,281, filed on Jun. 15, 2007.

(51) Int. Cl.
*G06F 15/173* (2006.01)
*H04L 12/751* (2013.01)

(52) U.S. Cl.
CPC ...................................... *H04L 45/02* (2013.01)
USPC ...................................... 709/238; 370/395.31

(58) Field of Classification Search
CPC ...................................................... H04L 45/02
USPC ............................... 709/238; 370/351, 395.31
See application file for complete search history.

(56) References Cited

U.S. PATENT DOCUMENTS

| | | | | |
|---|---|---|---|---|
| 6,928,483 B1* | 8/2005 | Cain | | 709/238 |
| 7,489,700 B2* | 2/2009 | Oogushi | | 370/409 |
| 7,733,868 B2* | 6/2010 | Van Zijst | | 370/394 |
| 7,836,497 B2* | 11/2010 | Hossain et al. | | 726/15 |
| 7,860,016 B1* | 12/2010 | Vijendra et al. | | 370/242 |
| 8,306,043 B2* | 11/2012 | Breslau et al. | | 370/401 |
| 2002/0027906 A1* | 3/2002 | Athreya et al. | | 370/386 |
| 2002/0120732 A1* | 8/2002 | Lee et al. | | 709/223 |
| 2003/0126233 A1* | 7/2003 | Bryers et al. | | 709/219 |
| 2004/0013120 A1* | 1/2004 | Shen | | 370/395.31 |

(Continued)

OTHER PUBLICATIONS

M. Gupta et al., "Authentication/Confidentiality for OSPFv2," Internet Engineering Task Force (IETF), Internet Draft, Document: draft-gupta-ospf-ospfv2-sec-00.txt, The Internet Society, Oct. 2006, 12 pgs.

(Continued)

*Primary Examiner* — Larry Donaghue
*Assistant Examiner* — James Conaway
(74) *Attorney, Agent, or Firm* — Shumaker & Sieffert, P.A.

(57) ABSTRACT

Techniques are described for providing encryption and authentication for different types of routing protocol communications based on a variety of factors. A method comprises configuring, on a network router, a set of logical interfaces for communicating routing protocol messages with one or more peer routing devices, maintaining a set of security associations that define corresponding authentication information and encryption information for the routing protocol messages, and maintaining one or more descriptor sets that each specify a set of criteria, wherein, for at least one of the descriptor sets, the set of criteria specifies one of the logical interfaces of the network router. The method further comprises selecting one of the descriptor sets having criteria that match an individual flow, selecting one of the security associations based on the selected descriptor set, and applying the selected security association to secure the outbound flow of the routing protocol messages.

33 Claims, 4 Drawing Sheets

(56) References Cited

U.S. PATENT DOCUMENTS

| | | |
|---|---|---|
| 2006/0184999 A1* | 8/2006 | Guichard et al. .................. 726/3 |
| 2006/0198368 A1* | 9/2006 | Guichard et al. ............. 370/389 |
| 2006/0221958 A1* | 10/2006 | Wijnands et al. ............. 370/389 |
| 2007/0058638 A1* | 3/2007 | Guichard et al. ........ 370/395.31 |
| 2007/0118595 A1* | 5/2007 | Jain et al. ...................... 709/203 |
| 2007/0127464 A1* | 6/2007 | Jain et al. ...................... 370/389 |
| 2007/0201464 A1* | 8/2007 | Lv et al. ........................ 370/389 |

OTHER PUBLICATIONS

M. Gupta et al., "Authentication/Confidentiality for OSPFv3," Request for Comments RFC 4552, http://www.ietf.org/rfc/rfc4552, The Internet Society, Jun. 2006, 13 pgs.

J. Moy, "OSPF Version 2," Request for Comments (RFC) 2328, http://www.faqs.org/rfcs/rfc2328.html, The Internet Society, Apr. 1998, 244 pgs.

* cited by examiner

AUTHENTICATION AND ENCRYPTION OF ROUTING PROTOCOL TRAFFIC

This application claims the benefit of U.S. Provisional Application No. 60/944,281, filed Jun. 15, 2007, the entire content of which is incorporated herein by reference.

TECHNICAL FIELD

The invention relates to computer networks and, more particularly, to routing protocols used within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Conventional routers often maintain the routing information in the form of one or more routing tables or other data structures. The form and content of the routing tables often depend on the particular routing algorithm implemented by the router.

Upon receiving incoming packets, the routers examine information within the packets, and forward the packets in accordance with the routing information. In order to maintain an accurate representation of the topology of the network, routers periodically exchange routing information in accordance with routing protocols, such as the Border Gateway Protocol (BGP), the Intermediate System to Intermediate System (ISIS) protocol, the Open Shortest Path First (OSPF) protocol, and the Routing Information Protocol (RIP). The routers, for example, exchange control-plane messages conforming to the routing protocols to convey changes to routing topology.

Routing communications are very sensitive in nature. For example, by maliciously altering routing protocol communications between routers, or by masquerading as a router and outputting erroneous routing protocol communications, an attacker can cause a network to entirely misroute traffic, thereby severely disrupting network communications. Moreover, by intercepting routing communications, an attacker may assemble an understanding of a topology of the network and exploit the information in subsequent attacks.

Initial techniques for deterring such malicious behavior have proved very limited. For example, some techniques use simply authentication techniques (e.g., text-based passwords, MD5) between routers. Such techniques have proven to be weak and very susceptible to hacker attacks.

SUMMARY

In general, techniques are described for providing a generic security suite, e.g., Internet Protocol Security (IPSec), that can be applied to routing protocols. In one example, the techniques allow IPSec to be applied to the Open Shortest Path First (OSPF) protocol Version 2 for both authentication and encrypting inter-router, control-plane routing communications.

A network device may utilize the techniques to provide encryption and authentication for different types of routing protocol communications based on a variety of factors. For example, the techniques allow a network device to easily apply different security associations to particular traffic flows of routing protocol communications based on certain characteristics, such as an interface index that uniquely identifies the logical interface on which the packet is sent, destinations and particular routing instances within a network device. Moreover, the different security associations can easily be applied to interfaces of different logical types.

In one embodiment, a method comprises configuring, on a network router, a set of logical interfaces for communicating routing protocol messages with one or more peer routing devices, maintaining a set of security associations that define corresponding authentication information and encryption information for the routing protocol messages, and maintaining one or more descriptor sets that each specify a set of criteria, wherein, for at least one of the descriptor sets, the set of criteria specifies one of the logical interfaces of the network router. The method further comprises selecting one of the descriptor sets having criteria that match an individual flow, selecting one of the security associations based on the selected descriptor set, and applying the selected security association to secure the outbound flow of the routing protocol messages.

In another embodiment, a network device comprises a physical interface coupled to a computer network, a control unit executing one or more routing protocols, a set of logical interfaces for communicating routing protocol messages between the routing protocols and one or more peer routing devices, and a computer-readable medium storing: (i) a set of security associations that define corresponding authentication information and encryption information for the routing protocol messages, and (ii) one or more descriptor sets that each specify a set of criteria, wherein, for at least one of the descriptor sets, the set of criteria specifies one of the logical interfaces of the network router. The control unit applies the descriptor sets to an outbound flow of the routing protocol messages directed to one of the logical interfaces to select one of the descriptor sets having criteria that matches the individual flow, and wherein, upon selecting one of the security associations based on the selected descriptor set, the control unit applies the selected security association to secure the outbound flow of the routing protocol messages.

In another embodiment, a computer-readable medium comprises instructions that cause a processor to configure, on a network router, a set of logical interfaces for communicating routing protocol messages with one or more peer routing devices, maintain a set of security associations that define corresponding authentication information and encryption information for the routing protocol messages, maintain one or more descriptor sets that each specify a set of criteria, wherein, for at least one of the descriptor sets, the set of criteria specifies one of the logical interfaces of the network router, apply the descriptor sets to an outbound flow of the routing protocol messages directed to one of the logical interfaces to select one of the descriptor sets having criteria that matches the individual flow, and select one of the security associations based on the selected descriptor set. The instructions further cause the processor to apply the selected security association to secure the outbound flow of the routing protocol messages.

The invention may provide one or more advantages. For example, a network router may utilize the techniques to provide encryption and authentication for different types of routing protocol communications based on a variety of factors. That is, the techniques allow a network device to easily apply different security associations to particular traffic flows of routing protocol communications based on certain characteristics, such as the logical interface index associated with the traffic flows, destinations and particular routing instances within a network device.

Moreover, the techniques may provide stronger authentication techniques than, for example, MD5, which is weak and easily broken. In addition, the payloads of packets conforming to certain protocols, including OSPFv2, typically cannot be encrypted using MD5. Thus, MD5 may not provide a viable security option for protocols such as OSPFv2.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
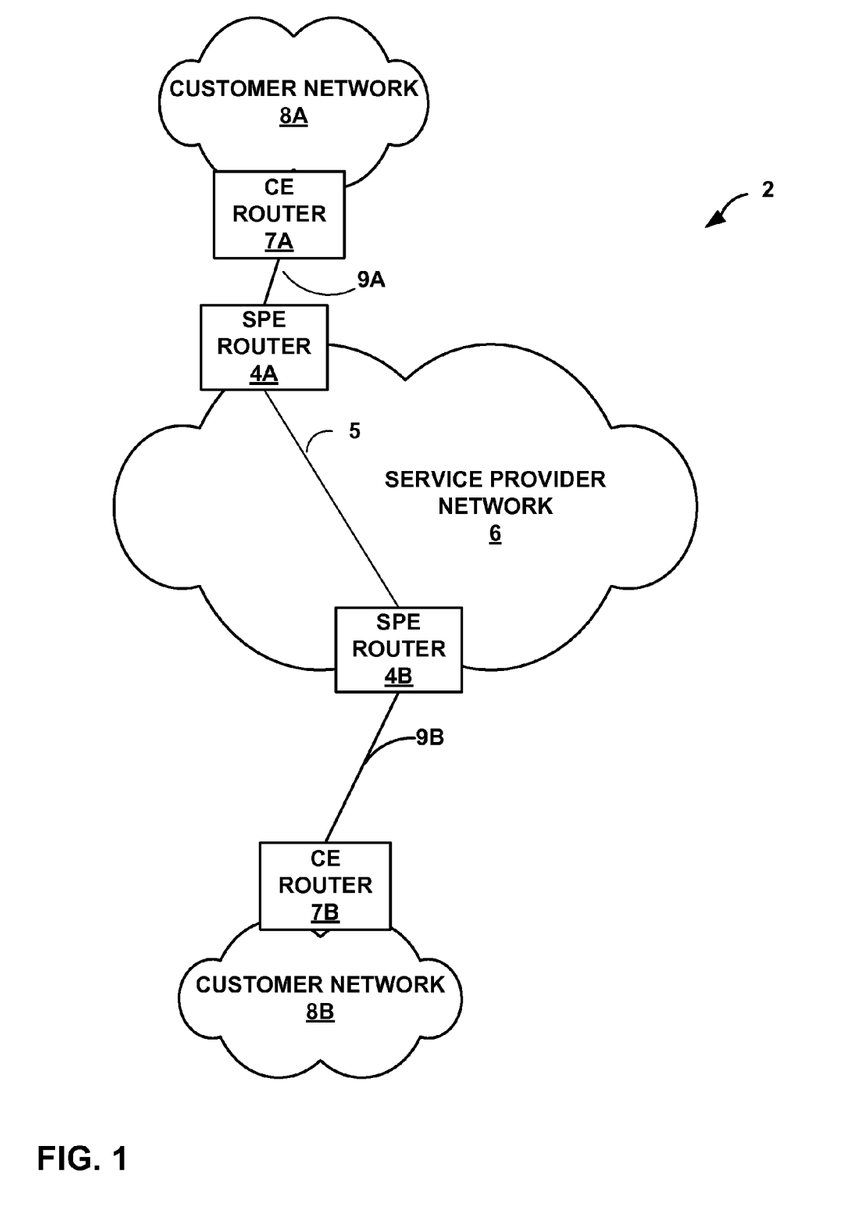
FIG. 1 is a block diagram illustrating an example network environment in which routers authenticate and encrypt routing protocol communications consistent with the principles of the invention.

FIG. 1 is a block diagram illustrating an example network system 2. In this example, provider edge routers 4A and 4B (collectively "provider edge routers 4") are edge routers of a service provider network 6 administered by a network service provider. Although only two provider edge routers 4 are shown, service provider network may include a number of additional devices implementing layer three (L3) routing functions.

In this example, provider edge routes provide connectivity for customer networks 8A and 8B (collectively "customer networks 8"). In particular, provider edge routers 4 are coupled to customer edge routers 7A and 7B (collectively "customer edge routers 7") of customer networks 8 via access links 9A and 9B, respectively. Customer networks 8 may be networks for geographically separated sites of an enterprise. Each of customer networks 8 may include one or more computing devices (not shown), such as personal computers, laptop computers, handheld computers, workstations, servers, switches, printers, and the like.

The configuration of network system 2 illustrated in FIG. 1 is merely exemplary. For example, an enterprise may include any number of customer networks 8. For example, service provider network 6 may be coupled to one or more networks administered by other providers, and may thus form part of a large-scale public network infrastructure, e.g., the Internet. Consequently, customer networks 8 may be viewed as edge networks of the Internet. The provider may provide computing devices within customer networks 8 with access to the Internet via provider network 6, and may allow computing devices within one of customer sites 8 to communicate with computing devices in the other of customer sites 8 over the Internet. Provider network 6 may include a variety of network devices, such as routers, switches, servers, and the like. Nonetheless, for ease of description, only customer networks 8A and 8B are illustrated in FIG. 1.

Provider edge routers 4 and customer edge routers 7 provide data-plane routing functionality by receiving incoming packets, examining information within the packets, and forwarding the packets in accordance with the routing information representative of the topology of network system 2. Each of provide edge routers 4 and customer edge routers 7 maintain the routing information and make forwarding decisions using one or more routing protocols, such as the Border Gateway Protocol (BGP), the Intermediate System to Intermediate System (ISIS) protocol, the Open Shortest Path First (OSPF) protocol, and the Routing Information Protocol (RIP). In order to maintain an accurate representation of the topology of the network, provider edge routers 4 and customer edge routers 7 exchange routing information using routing protocol messages that conform to specifications of the routing protocols. Routers 4, 7, for example, produce control-plane messages in response to network events (e.g., link status changes) to convey changes in routing topology.

Consistent with the techniques described herein, provider edge routers 4 and/or customer edge routers 7 utilize secure communications when communicating routing information to routing peers. In particular, provider edge routers 4 establish secure associations to securely carry control-plane routing information with routing peers, such as customer edge routers 7. Provider edge routers 4 and/or customer edge routers 7 may be pre-configured with security keys for use with authentication and encryption for secure associations. Alternatively, provider edge routers 4 and/or customer edge routers 7 may dynamically exchange the security keys. For purposes of example, provider edge routers 4 are described as utilizing a generic security suite of protocols, e.g., Internet Protocol Security (IPSec), for secure routing protocol communications. In one example, the techniques allow provider edge routers 4 to apply IPSec to the OSPF protocol Version 2 for both authenticating and encrypting inter-router, control-plane routing communications. Other devices, such as customer edge routers 7, may apply the techniques in a similar manner.

Provider edge routers 4 automatically configure descriptor sets (i.e., flow filters) for application of different types of security associations to particular traffic flows of routing protocol communications. As provider edge routers 4 learn of new peers, the provider edge routers may automatically create new descriptor sets to identify particular traffic flows of control-plane routing protocol communications. Each descriptor set may identify certain characteristics of the routing communications, such as an interface index that uniquely identifies the logical interface on which the packet is sent, destinations for the routing protocol communications (e.g., destination IP address), and particular routing instances (e.g., physical or virtual routing engines) within a routing device. The interface index may be unique across all routing instances.

In one embodiment, for a multicast packet, only the interface index is specified in the descriptor set, and the destination address and routing instance are set as wildcards so that any multicast packet directed to the specified interface is detected and the corresponding security association is applied. In one embodiment, for a unicast packet, the destination address and the routing instance may be specified in the descriptor set, with the interface index set as a wildcard so that any unicast packet matching the destination address and the routing instance would trigger detection of the unicast packet flow and application of the corresponding security association.

Each descriptor set may also be associated with a particular security association, which defines the type of security to be applied to the particular flow of routing protocol communications. Provider edge routers 4, for example, may be pre-configured to specify the security associations. Alternatively, or in addition, the provider edge routers may automatically update the descriptor sets and security associations as new routing peers are learned in accordance with the routing protocols. For example, provider edge routes 4 may learn of a new peer via a routing protocol. Upon discovering a new peer, provider edge routers 4 automatically update the descriptor sets and security associations for secure routing protocol communications though network 2. In addition, provider edge routers 4 may receive routing information that typically describes a topology of customer networks 8, including routes to network destinations within the customer networks.

Although the techniques have been described in reference to provider edge routers 4, the invention is not so limited, and may be applied by any router or other device that performs layer-three (L3) functions. For example, customer edge routers 7 or even core routers within network 6 may implement the techniques described herein.

Figure 2:
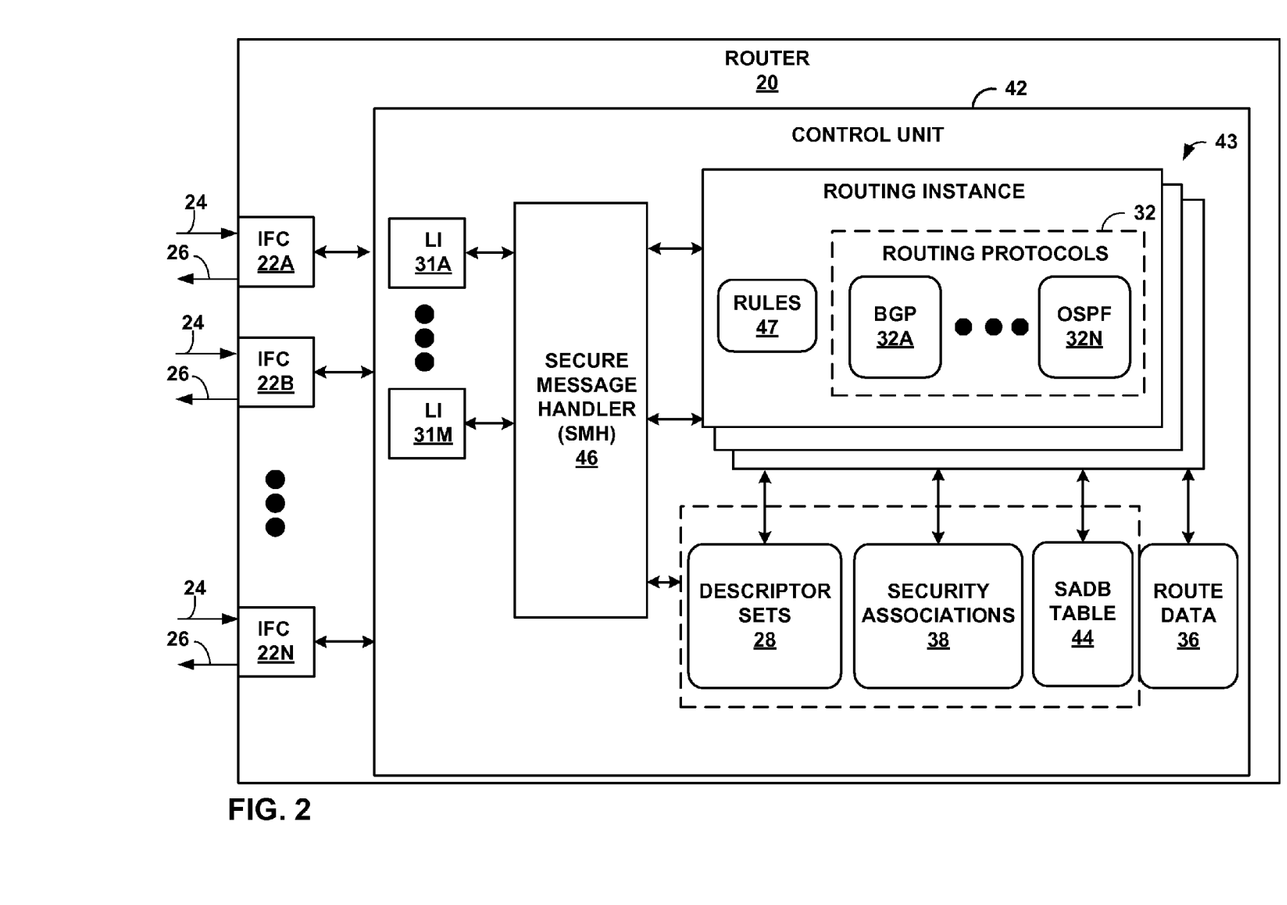
FIG. 2 is a block diagram illustrating an exemplary embodiment of a router in accordance with the principles of the invention.

FIG. 2 is a block diagram illustrating an exemplary embodiment of a router 20 that automatically applies security associations consistent with the principles of the invention. Router 20 may be any router, for example, any of provider edge routers 4 or customer edge routers 7 describe above.

In the example embodiment of FIG. 2, router 20 includes interface cards 22A-22N ("IFCs 22") that receive and send packet flows via network links 24 and 26, respectively. IFCs 22 are typically coupled to network links 24, 26 via a number of physical interface ports (not shown). IFCs 22 receive and forward data plane packets in accordance with forwarding information generated by control unit 42 in accordance with route data 36 maintained by routing protocols 32. That is, provider edge router 4A receives inbound packets from network links 24, determines destinations for the received packets, and outputs the packets on network links 26 based on the destinations. More specifically, upon receiving an inbound packet via one of inbound links 24, a respective one of IFCs 22 relays the packet to control unit 24. In response, control unit 42 reads a block of data from the packet, referred to as the "key," that includes a network destination for the packet. The key may, for example, contain a routing prefix for another router within the network. Based on the destination, control unit 42 analyzes route data 36 to select a route for the packet.

Router 20 may include a chassis (not shown) having a number of slots for receiving a set of cards, including IFCs 22. Each card may be inserted into a corresponding slot of a chassis for electrically coupling the card to a control unit 42 via a bus, backplane, or other electrical communication mechanism. IFCs 22 may be coupled by a high-speed switch, such as a cross-bar switch or three-stage switch fabric.

In addition, IFCs 22 send and receive control plane routing protocol communications on behalf of routing protocols 32 executing within control unit 42. Routing protocol processes 32A-32N ("routing protocols 32") represent software processes that implement routing protocols by which provider edge router 4A exchanges routing information with other routing devices, thereby learning the topology of the network, i.e., the routes through the network. Routing protocols may include exterior routing protocols to exchange routing information with routers of other domains or autonomous systems, e.g., BGP routing protocol. In addition, the routing protocols may include interior routing protocols, e.g., the OSPF routing protocol to learn of "internal" routes. Control unit 42 receives routing information from other routing devices in accordance with the routing protocols and, based on the routing information, provider edge router 4A generates route data 36 that describes the routes.

As shown in FIG. 2, routing protocols 32 may define logical interfaces 31A-31M (collectively, "logical interfaces 31") for communicating with routing protocols on peer devices. Each of logical interfaces (LIs) 31 has a corresponding interface identifier (1-M), and is a software construct representing a type of communication interface for communicating with one or more peer routing devices. Logical interfaces 31 are associated with physical interfaces and provide routing protocols 32 with a level of abstraction from the physical interfaces provided by IFCs 22.

Each of routing protocols 32 may define different types of logical interfaces 31 in accordance with the interface supported by the particular routing protocol. For example, OSPF v2 routing protocol 32N may define logical interfaces 31 of types: Point-to-Point (P2P) interfaces, Broadcast LAN interfaces, Non-Broadcast Multiple Access (NBMA) interfaces, OSPF Virtual links and OSPF Sham links. Each of logical interfaces 31 may define different communication characteristics for protocol packets associated with the particular logical interface, such as unicast or multicast packets.

In the example of FIG. 2, control unit 42 provides an operating environment for a plurality of different routing instances 43. That is, each of routing instances 43 may appear as an independent routing device within a network and operate as a separate routing engine. Each, routing instance may, for example, execute separate routing protocols 32 and maintain route data 36 isolated from the other routing instances. Routing instances 43 may execute on physically separate operating environments (routing engines) within control unit 42, or may implemented as separated software processes within an overall computing environment.

In accordance with the principles of the invention, routing protocols 32 utilize secure communications when communicating routing information on behalf of routing protocols 32. As described, routing protocols 32 negotiate and establish secure associations to securely carry control-plane routing information between router 20 and other routing devices. For purposes of example, routing protocols 32 are described as utilizing generic security suite of protocols, e.g., IPSec, for secure routing protocol communications. In one example, the techniques allow routing protocols 32 to apply IPSec to the OSPF protocol Version 2 for both authenticating and encrypting inter-router, control-plane routing communications.

Specifically, control unit 42 uses rules 47 to automatically configure descriptor sets 28 based on pre-defined configuration data, and/or upon learning of new peers, to identify individual traffic flows of routing protocol communications. Descriptor sets 28 specify criteria for identifying particular traffic flows of control-plane routing protocol communications between routing protocols 32 and peer routing protocols on other devices. Each entry defined with descriptor sets 28 specifies certain characteristics (i.e., matching criteria) of the routing protocol communications, such as the logical interfaces 31 associated with the particular flow of routing protocol communications, the destination peer device for the particular flow of routing protocol communications, and the particular one of routing instances 43 that originated the flow. Control unit 42 may use rules 47 to configure the descriptor sets 28 differently depending on the particular type of logical interface 31 associated with the network peer.

Security associations database table 44 (SADB TABLE 44 in FIG. 2) maps entries within descriptor sets 28 to security associations 38. As one example, SADB table 44 includes a set of entries, where each entry maps an entry within descriptor sets 28 to an entry within security associations 38. In this manner, descriptor sets for matching and identifying individual flows of routing protocol communications are individually mapped to different security associations 38.

Each of security associations 38 defines a particular type of security to be applied to the corresponding flow of routing protocol communications. For example, each entry within security associations 38 may define all authentication data and, optionally, all encryption data to be applied on the individual flow-basis, i.e., to any flow matching the particular criteria specified by the descriptor set(s) to which the security association is assigned.

Secure routing message handler (SMH) 46 manages secure communications with peer routing devices on behalf of routing protocols 32. In this example, SMH 46 receives (e.g., intercepts) outbound routing protocol communications issued by routing protocols 32 and automatically applies the appropriate security associations to the routing protocol communications. Similarly, SMH 46 processes inbound routing protocol communications to remove any encryption and pass the communications to routing protocols 32 in clear text form. In one embodiment, SMH 46 may apply the security associations on a per-packet basis, i.e., by authenticating and encrypting/decrypting individual packets. In addition, the decision to apply the security association may be made on a per-packet basis for a communication socket or may be made once for all packets for the socket.

For example, SMH 46 may receive a packet for a particular inbound or outbound flow of routing protocol communications by application of descriptor sets 28. Upon determining that the packet or set of packets matches a particular entry in descriptor sets 28, SMH 46 references SADB table 44 to identify a corresponding entry within security associations 38 to be applied to the packets. Although shown for ease of illustration as separate from routing protocols 32, the functionality of SMH 46 may be incorporated within routing protocols 32.

Routing protocols 32, or SMH 46 on behalf of routing protocols 32, may automatically and dynamically update SADB table 44 upon discovering and initiating communications with a new routing peer. Similarly, routing protocols 32, or SMH 46 on behalf of routing protocols 32, may automatically and dynamically update SADB table 44 upon the detected unavailability or failure of a routing peer.

For example, an OSPF protocol 32 may discover a peer supporting the OSPF protocol, either dynamically by way of OSPF messages or by receiving configuration information from an administrator. Upon router 20 negotiating a secure OSPF routing session with the peer using IPSec, including a key exchange using the IKE protocol, rules 47 may create a new entry within descriptor sets 28, by applying rules and taking into account the routing protocol, for identification of the corresponding flow of routing protocol communications with the OSPF peer. Rules 47 also update security associations 38 to store any authentication information and encryption information associated with the OSPF peering session. Furthermore, rules 47 may update SADB table 44 to associate the new entry within descriptor sets 28 with the new entry within security associations 38.

The architecture of provider edge router 4A illustrated in FIG. 2 is for exemplary purposes only, and the principles of the invention are not limited to this architecture. Control unit 42 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like.

The functions of provider edge router 4A may be implemented by executing the instructions of the computer-readable medium with one or more processors, discrete hardware circuitry, firmware, software executing on a programmable processor, or a combination of any of the above. Control unit 42 may maintain descriptor sets 28, security associations 38, SADB table 44, rules 47, and route data 36 in the form of one or more tables, databases, link lists, radix trees, databases, flat files, or any other data structures.

Figure 3:
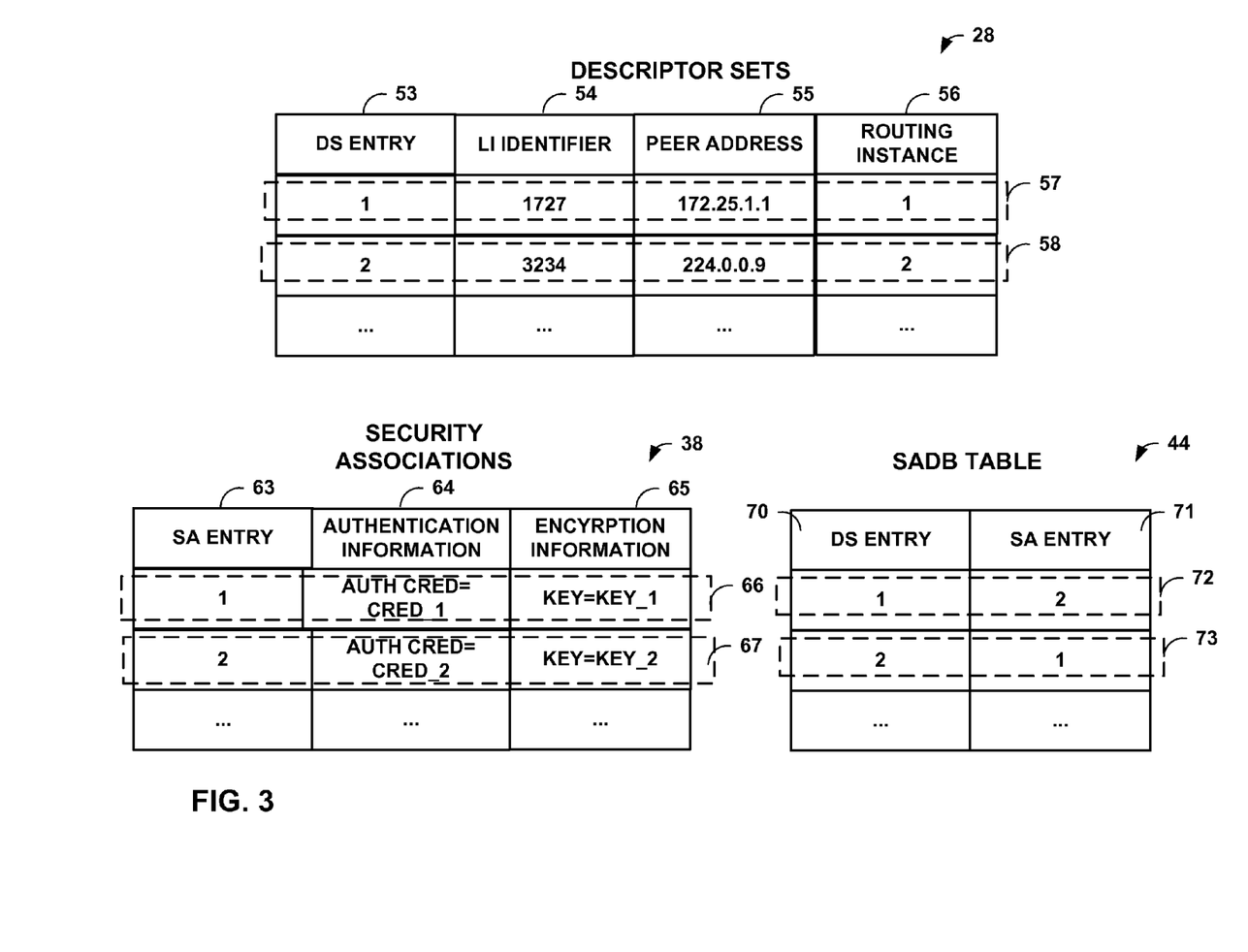
FIG. 3 illustrates exemplary embodiments of data structures maintained by the router of FIG. 2.

FIG. 3 illustrates exemplary embodiments of data structures maintained by router 20 of FIG. 2. Specifically, FIG. 3 shows an exemplary embodiment of descriptor sets 28 in tabular form. In this example, descriptor sets 28 include a plurality of columns 53, 54, 55, 56. Column 53 stores values representing an index for entries within descriptor sets 28. Column 54 stores identifiers for logical interfaces associated with each descriptor set. Column 55 stores peer addresses for peer routing devices for the descriptor sets. Column 56 stores data identifying the particular routing instance associated with the descriptor set.

In this example, descriptor sets 28 include two entries 57, 58. Entry 57 is designated by descriptor set (DS) entry of 1 and specifies criteria of a logical interface identifier of 1727, a peer address of 172.25.1.1, and a routing instance associated with an instance identifier 1. Similarly, entry 58 is designated by DS entry of 2 and specifies criteria of a logical interface identifier of 3234, a peer address of 224.0.0.9 and is associated with routing instance 2.

In this manner, exemplary descriptor sets 28 describe two different descriptor sets. A descriptor set may be associated with a single routing peer or a group of routing peers, as specified by peer address 55. For example, where the peer address is a unicast address, the descriptor set only applies to a single peer, and where the peer address is a multicast address, then the descriptor set can apply to a plurality of peers that are using that multicast address. Logical interface identifier 54, peer address 55 and routing instance 56 constitute a set of criteria for identifying particular flows of routing protocol communications. For outbound routing protocol communications, peer address 55 represents a destination address within the communications. For inbound routing protocol communications, peer address 55 may represent a source address for unicast communications and may represent a destination address for multicast communications. The descriptor sets are bidirectional.

In this example, a data structure for security associations 38 is also shown in tabular form. Security associations 38 include columns 63, 64 and 65. Column 63 represents an index into security associations 38 for referencing the entries within the security associations. Authentication information 64 stores authentication information to be used for a particular security association, i.e., to be provided to a peer router to establish a session for exchanging routing protocol information. Authentication information may be authentication credentials such as an authentication key, a user identifier, a password, or other authentication credentials. Encryption information 65 specifies any information needed to perform encryption services for the corresponding security association.

As one example, entry 66 of security associations 38 specifies a first security association entry having authentication information 64 that includes an authentication credential ("AUTH CRED") of "CRED_1." For this security association, router 20 provides authentication information as a specified authentication credential to the peer router in order to authenticate router 20 to the peer router. In addition, entry 66 specifies that an encryption key identified as "KEY_1" is to be used when encrypting and decrypting communications for the particular security association. The information specified within encryption information 65 may define the particular key or hash code itself, or may specify a file or location of data to be used as an encryption and decryption mechanism for entry 66. Similarly, entry 67 has an index of 2 and includes authentication information 64 specifying an authentication credential of "CRED_2." In addition, entry 67 specifies an encryption key of "KEY_2."

In the example of FIG. 3, an exemplary data structure for SADB TABLE 44 is also shown in tabular form having columns 70 and 71. In general, SADB TABLE 44 associates entries within descriptor sets 28 and security associations 38. In this example, SADB TABLE 44 includes two entries 72 and 73. The first entry 72 associates DS entry 1 of descriptor sets 28 with SA entry 2 of security associations 38. That is, for routing protocol communications matching the characteristics specified in DS entry 1 of descriptor sets 28, router 20 applies the particular authentication information 64 and encryption information 65 specified for SA entry 2 of security associations 38. Similarly, entry 73 of SADB Table 44 associates DS entry 2 of descriptor sets 28 with SA entry 1 of security associations 38. That is, for routing protocol communications matching the flow characteristics specified in DS entry 2, router 20 utilizes the authentication information 64 and encryption information 65 of SA entry 1 to encrypt and decrypt the routing protocol communications for the particular flow.

Figure 4:
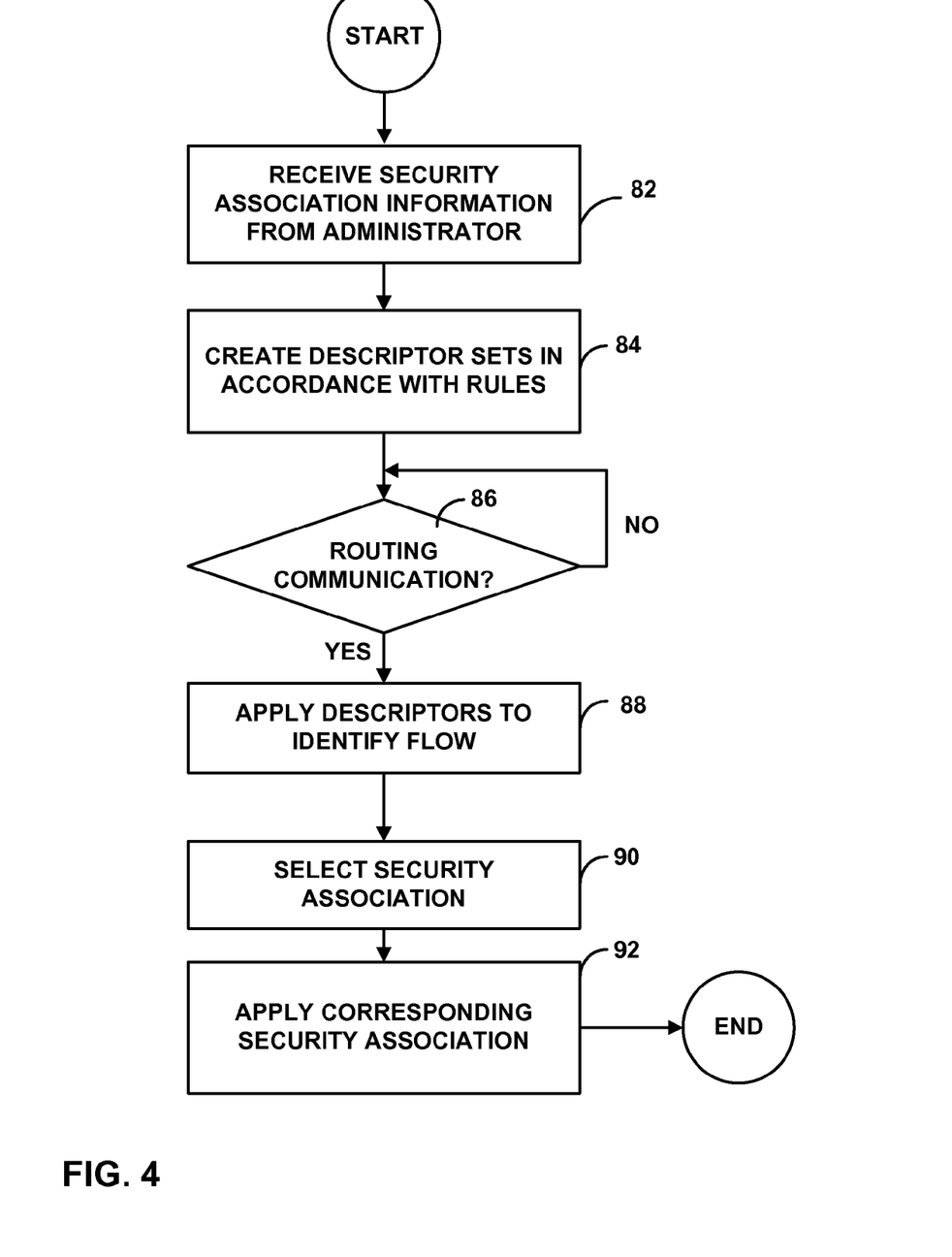
FIG. 4 is a flow diagram illustrating exemplary operation of a router in accordance with the principles of the invention.

FIG. 4 is a flow diagram illustrating example operation of a router in accordance with the principles of the invention. For exemplary purposes, the flow diagram of FIG. 4 will be explained in reference to router 20 of FIG. 2 with respect to the OSPF protocol.

Initially, router 20 may receive security association information from an administrator (82). Router 20 may learn of new peers as a result of the received security association information. Rules 47 updates security associations 38 according to the received information to create an entry specifying authentication information 64 and optionally any encryption information 65 to be used when encrypting and decrypting routing communications for the OSPF peering session. Rules 47 creates a new descriptor set entry within descriptor sets 28 for identification of the routing protocol communications with the new OSPF peer (84). Rules 47 may apply selected stored rules to create the new descriptor set. Rules 47 may select the rules based on the type of logical interface and/or the type of network traffic associated with the routing protocol communication. For example, the selected rules control the manner in which rules 47 creates the descriptor set for the particular routing protocol communication based on factors such as the type of network traffic (e.g., unicast or multicast), the type of routing protocol, the type of interface, and the type of destination. Rules 47 may then create an entry within SADB table 44 to associate (i.e., map) the new entry within descriptor sets 28 with the new entry within security associations 38.

Next, SMH 46 detects inbound or outbound control-plane routing protocol communications (86). Upon detecting an inbound or outbound control-plane routing protocol communication, SMH 46 determines a logical interface 31 associated with the routing protocol communication. Based on the logical interface 31, the peer address, and the routing instance, SMH 46 applies descriptor sets defined within descriptor sets 28 until finding a matching descriptor (88). A matching descriptor set indicates that the routing protocol communication matches a criteria for a defined packet flow, such as whether the routing protocol communication is associated with a particular logical interface, whether the routing protocol communication is outbound for or inbound from a particular peer, and whether the routing protocol communication is outbound for or inbound to a particular routing instance 43. If no match is found, SMH passes the routing communication without modification.

If, however, the routing protocol communication matches one of the descriptor sets, SMH 46 accesses SADB table 44 to determine a corresponding one of security associations 38 based on the DS entry 70 of the matching one of descriptor sets 28 (90). Upon selecting the appropriate security association, SMH 46 applies the security association to encrypt/decrypt the outbound/inbound routing protocol communication (92).

Alternatively, router 20 may discover a peer supporting the OSPF protocol dynamically by way of receiving OSPF broadcast messages from the peer. In some embodiments, router 20 may first negotiate an OSPF peering session with the routing peer for exchanging OSPF routing information with the peer. For example, OSPF protocol 32 executing within a routing instance 43 of router 20 may invoke SMH 46 to negotiate a secure communication with the peer router using IPSec, and may exchange public keys using the IKE key exchange protocol. In this example, upon SMH 46 establishing a secure OSPF routing session with the peer using IPSec, rules 47 updates descriptor sets 28, security associations 38 and SADB table 44. That is, rules 47 creates a new descriptor set entry within descriptor sets 28 as described above for identification of the routing protocol communications with the new OSPF peer.

In this manner, router 20 can easily configure and apply different security associations to different routing protocol communication based on a variety of criteria. OSPF protocol 32, for example, is configured to provide routing protocol communications on a per-interface basis. That is, OSPF protocol 32, for example, is configured to output routing protocol communications in a manner that is confined to, i.e., flows through, particular logical interfaces 31.

As described above, rules 47 creates the descriptor sets upon router 20 learning of a new peer device. Rules 47 may create one or more descriptor sets for an interface. The number of created descriptor sets may be based on the particular interface type and the routing protocol, and may depend on the manner in which the particular protocol behaves on an interface type, or protocol behavior with a particular peer device. Thus, the number of descriptor sets that rules 47 creates may depend on the type of protocol that router 20 is running, the type of peer devices, and the type of interfaces the peer devices are running.

To illustrate the flexibility of router 20 in this manner, upon creating the descriptor set rules 47 may indicate that, for point-to-point (P2P) logical interfaces, all OSPF routing protocol communications are specified to be in multicast form. Therefore, if a given security association is configured for a P2P logical interface, rules 47 creates a descriptor set to based on the knowledge that for P2P routing peer interfaces, all OSPF routing protocol packets are multicast. In this case, rules 47 creates a single descriptor set. As a result, in accordance with the matching descriptor set and corresponding security association, SMH 46 will apply IPSec on all outgoing OSPF packets. In addition, rules 47 creates the descriptor sets to direct SMH 46 to apply descriptor sets 28 to all inbound OSPF packets for the P2P logical interface to attempt to match the descriptor sets and apply the corresponding security association.

For logical interfaces that are of the type broadcast local area network (LAN), rules 47 may indicate that multiple OSPF peers can communicate through the same logical interface and that packets for that logical interface can either be multicast to all OSPF neighbors or unicast to a single OSPF peer. Due to this nature of traffic, rules 47 may create one or more descriptor sets to direct SMH 46 to apply the security association to both unicast and multicast OSPF traffic. For example, rules 47 creates at least one descriptor set that specifies the interface index, and specifies the peer address as a multicast address. Since the list of peers on a LAN may not be known, rules 47 may direct router 20 to rely on the peer discovery mechanism of the OSPF protocol to detect peers. Rules 47 will then add one descriptor set having the unicast address of each new peer device that router 20 discovers so as to match any unicast packet flows for the individual peers, and dynamically associates a security association for the logical interface with each of the descriptor sets.

For Non-Broadcast Multiple Access (NBMA) logical interfaces, rules 47 may define two modes of communications for OSPF routing communications: NBMA mode and point-to-multi-point (P2MP) mode. Further, rules 47 may specify that the packets may be either multicast or unicast for either case. Moreover, rules 47 may indicate that peer discovery mechanism of the OSPF protocol may not work reliably on NBMA interfaces and that, therefore, router 20 should require preconfigured information from an administrator to associate the security association for the NBMA logical interface with a descriptor set matching any unicast packet flows for the individual peers. Thus, for NBMA logical interfaces rules 47 may create a new descriptor set for each peer device with the unicast address of each peer device, and may associate a security association for the logical interface with the descriptor sets based on the preconfigured information.

For logical interfaces of the OSPF Virtual link or OSPF Sham link, rules 47 may indicate that all traffic associated with the logical interface is unicast and is typically destined for a single OSPF peer. As a result, rules 47 create a single descriptor set that indicates that a single security association can be defined for the logical interface and applied to all unicast packets going to the peer address. The descriptor set that rules 47 creates in this case is based on the peer address, with the interface index as a wildcard.

In this manner, the techniques described herein allow router 20 to differentiate between traffic for certain types of logical interfaces and apply the security associations in the proper manner. Based on this differentiation, router 20 can selectively apply different security associations. As one example, the techniques may allow router 20 to detect multicast routing protocol communications on a per-logical interface basis and apply different security associations to the multicast communications based on the logical interfaces to which the communications are directed. As another example, the techniques may allow router 20 to detect unicast routing protocol communications directed to specific peers and apply different security associations to the unicast communications based on the particular peer address and, optionally, the routing instance.

As described, a network device may utilize the techniques to provide encryption and authentication for different types of routing protocol communications based on a variety of factors. For example, the techniques allow a network device to easily apply different security associations to particular traffic flows of routing protocol communications based on certain characteristics, such as an interface index that uniquely identifies the logical interface on which the packet is sent, destinations, and particular routing instances within a network device. The techniques described herein may be embodied within a layer three (L3) routing device, a mixed-device implementing layer two (L2) and L3 functionality, or within an intermediate device positioned between two routing devices.

Various embodiments of the invention have been described. Although described for purposes of example with respect to OSPFv2, the techniques described herein may readily be applied to other protocols. For example, the techniques may be applied to BGP, RIP, or other protocols. These and other embodiments are within the scope of the following claims.

The invention claimed is:

1. A method comprising:

configuring, on a network router, a set of logical interfaces for communicating flows of routing protocol messages with one or more peer routing devices, wherein each of the flows represents a peering session for exchanging routing information with a corresponding one of the peer routing devices, wherein each of the logical interfaces is associated with a physical interface, and comprises a software construct representing a type of communication interface for communicating with one or more of the peer routing devices;

maintaining a set of security associations that define corresponding authentication information and encryption information for the routing protocol messages;

maintaining one or more descriptor sets that each specify a set of criteria for identifying: (1) a destination address for the routing protocol messages corresponding to one of the peer routing devices, (2) an interface index that uniquely identifies the logical interface of the network router over which the corresponding flow to the peer routing device is communicated, and (3) a routing instance within the network router associated with the routing protocol messages, wherein the descriptor sets can be applied, based on the criteria, to routing protocol messages sent from any of a plurality of different types of logical interfaces including Point-to-Point (P2P) interfaces, Broadcast LAN interfaces, Non-Broadcast Multiple Access (NBMA) interfaces, Open Shortest Path First (OSPF) Virtual links, and OSPF Sham links;

by the network router, applying the descriptor sets to an outbound flow of the routing protocol messages directed to one of the logical interfaces to select one of the descriptor sets having criteria that identify the outbound flow;

by the network router, selecting one of the security associations based on the selected descriptor set; and applying the selected security association to secure the outbound flow of the routing protocol messages.

2. The method of claim 1, wherein applying the selected security association comprises applying the encryption information of the selected security association to encrypt the outbound flow of the routing protocol messages.

3. The method of claim 1, wherein applying the selected security association comprises automatically communicating the authentication information of the selected security association to a peer routing device prior to forwarding the outbound flow of the routing protocol messages to the peer routing device.

4. The method of claim 1, wherein applying the selected security association comprises communicating the authentication information of the selected security association to a peer routing device within a routing protocol message to the peer routing device.

5. The method of claim 1, further comprising pre-configuring the authentication information on the network router.

6. The method of claim 1, further comprising:
applying the descriptor sets to an inbound flow of the routing protocol messages received from one of the logical interfaces to select one of the descriptor sets having criteria that identify the inbound flow;
selecting one of the security associations based on the selected descriptor set; and
applying the authentication information and the encryption information of the selected security association to decrypt the inbound flow of the routing protocol messages.

7. The method of claim 1, further comprising:
learning of at least one peer routing device using a routing protocol discovery procedure; and
automatically creating one or more new descriptor sets in response to the network router learning of the new peer routing device.

8. The method of claim 7,
wherein creating the descriptor set comprises:
determining an interface type for the logical interface associated with the new peer routing device; and
applying one or more rules from a set of rules based on the determined interface type to create the descriptor set, and
wherein the method further comprises associating the created descriptor set with a security association.

9. The method of claim 8,
wherein applying one or more rules comprises applying the rules to determine whether the determined interface type is associated with multicast routing protocol packets and not unicast routing protocol packets, and
wherein controlling the application of the selected security association comprises automatically creating the descriptor sets for identifying the multicast routing protocol packets.

10. The method of claim 8,
wherein applying one or more rules comprises applying the rules to determine whether routing protocol messages for the determined interface type conform to multicast routing protocol packets, unicast routing protocol packets, or both; and
wherein controlling the application of the selected security association comprises automatically creating the descriptor sets for identifying the multicast routing protocol packets and the unicast routing protocol packets.

11. The method of claim 8,
wherein applying one or more rules comprises applying the rules to determine whether the determined interface type is associated with unicast routing protocol packets directed to the logical interfaces; and
wherein controlling the application of the selected security association comprises automatically creating the descriptor sets for identifying the unicast routing protocol packets.

12. The method of claim 8, wherein the rules specify a reliability of a routing protocol discovery procedure when applied to the determined interface type.

13. The method of claim 1, wherein applying the selected security association comprises applying the Internet Protocol Security (IPSec) protocol to the outbound flow.

14. The method of claim 1, wherein the routing protocol messages conform to Open Shortest Path First (OSPF) protocol version 2.

15. The method of claim 1, wherein when the routing protocol messages comprise multicast packets, the selected descriptor set specifies the interface index with wildcards for matching packet flows from any routing instance to any destination address within the group of multicast addresses.

16. The method of claim 1, wherein when the routing protocol messages comprise unicast packets, the selected descriptor set specifies a destination address and routing instance, and specifies the logical index as a wildcard within the descriptor sets, to match any unicast flow from the specified routing instance to the specified destination address.

17. The method of claim 1, further comprising:
maintaining a table that maps each of the descriptor sets to one of the security associations,
wherein selecting one of the security associations based on the selected descriptor set comprises accessing the table with the selected descriptor set to select the corresponding security association.

18. The method of claim 17, further comprising:
in response to the network router discovering one of the peer routing devices using a routing protocol discovery procedure:
automatically creating, by the network router, a new descriptor set with criteria for identifying a flow of routing protocol messages to the one of the peer routing devices, and
automatically creating a new entry within the table to map a new descriptor set to a security association.

19. A network device comprising:
a physical interface coupled to a computer network;
a control unit executing one or more routing protocols;
a set of logical interfaces for communicating flows of routing protocol messages between the routing protocols and one or more peer routing devices, wherein each of the flows represents a peering session for exchanging routing information with a corresponding one of the peer routing devices,
wherein each of the logical interfaces is associated with a physical interface, and comprises a software construct representing a type of communication interface for communicating with one or more of the peer routing devices; and
a non-transitory computer-readable medium storing: (i) a set of security associations that define corresponding authentication information and encryption information for the routing protocol messages, and (ii) one or more descriptor sets that each specify a set of criteria for identifying a destination address of a corresponding one of the peer routing devices, an interface index that uniquely identifies the logical interface of the network router over which the corresponding flow to the peer routing device is communicated, and a routing instance within the network router associated with the routing protocol messages, wherein the descriptor sets can be applied, based on the criteria, to routing protocol messages sent from any of a plurality of different types of logical interfaces including Point-to-Point (P2P) interfaces, Broadcast LAN interfaces, Non-Broadcast Multiple Access (NBMA) interfaces, Open Shortest Path First (OSPF) Virtual links, and OSPF Sham links,
wherein the control unit applies descriptor sets to an outbound flow of the routing protocol messages directed to one of the logical interfaces to select one of the descriptor sets having criteria that identifies the outbound flow, and wherein, in response to selecting one of the security associations based on the selected descriptor set, the control unit applies the selected security association to secure the outbound flow of the routing protocol messages.

20. The network device of claim 19, wherein the control unit applies the selected security association by applying the encryption information of the selected security association to encrypt the outbound flow of the routing protocol messages.

21. The network device of claim 19, wherein the control unit applies the selected security association by automatically communicating the authentication information of the selected security association to a peer routing device prior to forwarding the outbound flow of the routing protocol messages to the peer routing device.

22. The network device of claim 19, wherein the control unit applies the selected security association by communicating the authentication information of the selected security association to a routing device within a routing protocol message to the routing device.

23. The network device of claim 19, wherein the control unit applies the descriptor sets to an inbound flow of the routing protocol messages received from one of the logical interfaces to select one of the descriptor sets having criteria that identifies the inbound flow, selects one of the security associations based on the selected descriptor set, and applies the authentication information and the encryption information of the selected security association to decrypt the inbound flow of the routing protocol messages.

24. The network device of claim 19, wherein the control unit learns of at least one peer routing device using a routing protocol discovery procedure, and automatically creates one or more new descriptor sets in response to the network router learning of the new peer routing device.

25. The network device of claim 24, wherein the control unit automatically creates the descriptor set by determining an interface type for the logical interface associated with the new peer routing device and applies one or more rules from a set of rules based on the determined interface type to create the descriptor set, and wherein the control unit associates the created descriptor set with a security association.

26. The network device of claim 25, wherein the control unit determines whether the determined interface type is associated with multicast routing protocol packets and not unicast routing protocol packets and creates the descriptor sets for identifying the multicast routing protocol packets.

27. The network device of claim 25, wherein the control unit determines whether routing protocol messages for the determined interface type conform to multicast routing protocol packets, unicast routing protocol packets, or both and automatically creates the descriptor sets for identifying to the multicast routing protocol packets and the unicast routing protocol packets.

28. The network device of claim 25, wherein the control unit determines whether the determined interface type is associated with unicast routing protocol packets directed to the logical interfaces and automatically creates the descriptor sets for identifying to the unicast routing protocol packets.

29. The network device of claim 19, wherein the routing protocol messages conform to Open Shortest Path First (OSPF) protocol version 2.

30. The network device of claim 19, wherein the non-transitory computer-readable medium stores: (iii) a table that maps each of the descriptor sets to one of the security associations, and wherein the control unit selects one of the security associations based on the selected descriptor set by accessing the table with the selected descriptor set to select the corresponding security association.

31. The network device of claim 30, wherein the control unit automatically creates a new entry within the table to map a new descriptor set to a security association.

32. A non-transitory computer-readable medium comprising instructions that cause a processor to:

configure, on a network router, a set of logical interfaces for communicating flows of routing protocol messages with one or more peer routing devices, wherein each of the flows represents a peering session for exchanging routing information with a corresponding one of the peer routing devices, wherein each of the logical interfaces is associated with a physical interface, and comprises a software construct representing a type of communication interface for communicating with one or more of the peer routing devices;

maintain a set of security associations that define corresponding authentication information and encryption information for the routing protocol messages;

maintain one or more descriptor sets that each specify a set of criteria for identifying (1) a destination address for the routing protocol messages corresponding to one of the peer routing devices, (2) an interface index that uniquely identifies the logical interface of the network router over which the corresponding flow to the peer routing device is communicated, and (3) a routing instance within the network router associated with the routing protocol messages, wherein the descriptor sets can be applied, based on the criteria, to routing protocol messages sent from any of a plurality of different types of logical interfaces including Point-to-Point (P2P) interfaces, Broadcast LAN interfaces, Non-Broadcast Multiple Access (NBMA) interfaces, Open Shortest Path First (OSPF) Virtual links, and OSPF Sham links;

apply the descriptor sets to an outbound flow of the routing protocol messages directed to one of the logical interfaces to select one of the descriptor sets having criteria that identify the outbound flow;

select one of the security associations based on the selected descriptor set; and apply the selected security association to secure the outbound flow of the routing protocol messages.

33. The method of claim 1, further comprising:

applying a first one of the descriptor sets to a first outbound flow directed to a first one of the logical interfaces to select a first one of the descriptor sets having criteria that identify the first outbound flow; and selecting a first one of the security associations based on the selected first one of the descriptor sets;

applying a second one of the descriptor sets to a second outbound flow directed to a second one of the logical interfaces to select a second one of the descriptor sets having criteria that identify the second outbound flow, and selecting a second one of the security associations based on the selected second one of the descriptor sets, wherein the first one of the logical interfaces and the second one of the logical interfaces represent different types of communication interfaces, and wherein the first one of the security associations applies a different type of security to the corresponding flow of routing protocol communications.

* * * * *